April 7, 1942.                L. C. STEARMAN                2,279,074
                           AIRPLANE LANDING GEAR
                            Filed June 19, 1939
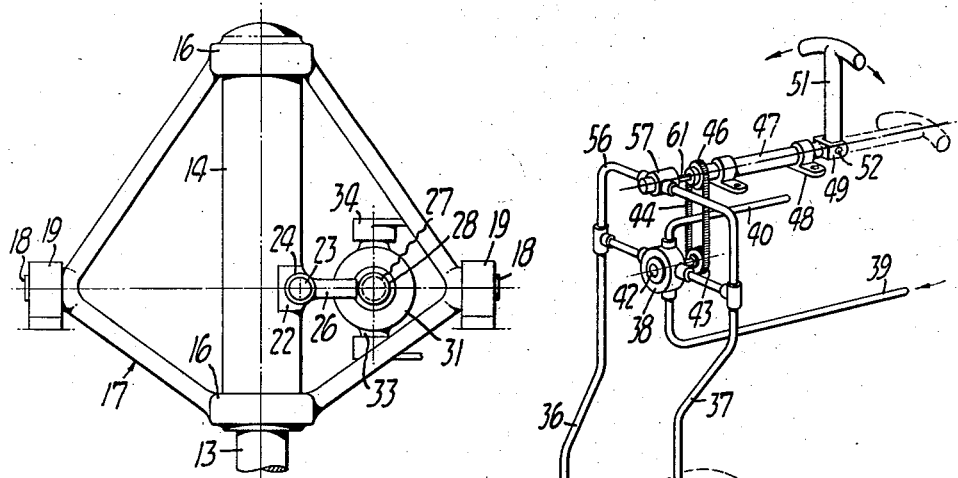
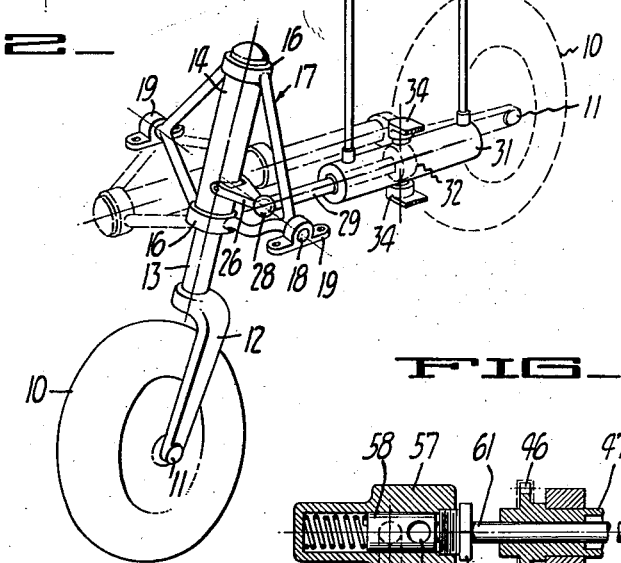
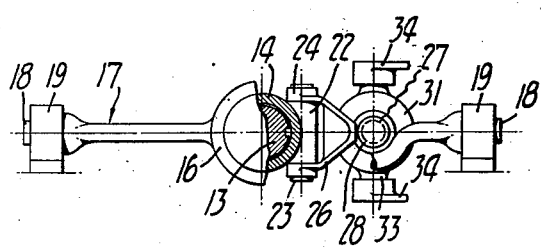
INVENTOR
Lloyd C. Stearman
BY
ATTORNEY Patented Apr. 7, 1942

2,279,074

UNITED STATES PATENT OFFICE 2,279,074

AIRPLANE LANDING GEAR

Lloyd C. Stearman, Burlingame, Calif., assignor to Transair Corporation, San Francisco, Calif., a corporation of California Application June 19, 1939, Serial No. 279,908

5 Claims. (Cl. 244—50)

This invention relates generally to landing gear for airplanes and is concerned more particularly with the provision of an improved steering mechanism for a retractable wheel of such landing gear.

It is a general object of the invention to provide improved steering mechanism for the landing gear of an airplane.

Another object of the invention is to provide an improved steering mechanism of the character referred to which can be enabled or disabled selectively.

Another object of the invention is to provide improved steering mechanism for a retractable wheel in the landing gear of an airplane.

Another object of the invention is to provide improved steering mechanism for the retractable wheel of the landing gear, in which the steering mechanism is automatically disabled when the wheel is retracted.

Another object of the invention is to provide a landing gear of the character referred to, in which the steerable wheel can be controlled either for steering movement or for free swivelling movement.

Other objects and advantages of the invention will be apparent from the following description of a preferred embodiment thereof as illustrated in the accompanying drawing, in which Fig. 1 is a schematic perspective view of the steerable front wheel of a tricycle landing gear and the steering mechanism therefor.

Fig. 2 is a fragmentary front elevational view of a part of the steerable wheel structure with the wheel in ground-engaging position.

Fig. 3 is a view similar to Fig. 2 with the parts as positioned when the wheel is in retracted position.

Fig. 4 is a sectional detail view of a part of the control mechanism for the steerable wheel of the landing gear.

Referring to the drawing, Fig. 1 illustrates a schematic perspective view showing in full lines the ground-engaging position of the front wheel of a tricycle landing gear which is mounted for movement between the ground-engaging position shown and a retracted position illustrated in dotted lines. Preferably control mechanism is provided for the wheel whereby it can be freed for limited swivelling movement or it can be positively steered in either direction as controlled by the pilot in the cockpit. The construction is such that the wheel is automatically adjusted to its straight-ahead position whenever it is moved from its ground-engaging position to its retracted position.

The landing wheel 10, Fig. 1, is journalled on axle 11 carried by a bracket arm 12 depending from a rod 13 which is connected through suitable shock absorbing means with a cylinder 14. Cylinder 14 is journalled in spaced bearings 16 forming part of the strut construction 17 having trunnions 18 journalled in bearings 19 of the airplane structure. Bearings 16 also prevent endwise movement of tube 14. The pivotal connection of the strut construction 17 with the bearings 19 provides for movement of the wheel 10 between its ground-engaging position shown in full lines and its retracted or flying position shown in dotted lines.

The rod 13 and the cylinder 14 form part of a conventional shock absorbing mechanism commonly employed in landing gear of the type shown and which it is not deemed necessary to show in detail because its construction is not pertinent to the instant invention except that the rod and the cylinder are connected for relative endwise sliding movement but must rotate together.

The entire wheel structure described above has associated therewith a power-operated mechanism for effecting the steering movement of the wheel, and preferably such mechanism is of the hydraulic type and may include a cylinder and piston structure suitably mounted upon the airplane structure and having a novel form of connecting means with the wheel structure. For this purpose the cylinder 14 is provided with an apertured boss 22 (Figs. 1 to 3) to receive a pin 23 having its ends engaged with respective bearing portions 24 of a link 26. The axis of the pin 23 is perpendicular to the axis of the rod 13 about which the wheel 10 is turned for steering or swivelling movement.

As shown on Fig. 3 the outer end of link 26 may be formed as a ball 27 which is received in a split socket 28 at the end of piston rod 29. Within the cylinder 31, piston rod 29 carries piston 32 which in the straight-ahead position of the wheel 10 is disposed midway of the ends of the cylinder. The cylinder 31 (Fig. 1) is mounted for limited pivotal movement in a horizontal plane by respective trunnions 33 thereon engaging bearings 34 of the airplane structure. In this way the piston and cylinder structure can pivot slightly during endwise movement of the piston rod to accommodate the arcuate movement of the link 26 about the axis of the rod 13.

Hydraulic means is provided for controlling the position of the piston rod with respect to the cylinder and for maintaining the piston rod hydraulically locked and positioned between operations thereof for steering movement. To provide for the applying of pressure at either side of the piston 32 respective lines 36 and 37 which are preferably of flexible construction, are connected to the respective ends of the cylinder and lead to opposite sides of a steering control valve 38 of a conventional design and having a pressure line 39 and a return line 40 connected thereto. The line 39 leads from a suitable source of hydraulic pressure while line 40 empties into the source of liquid supply therefor.

To provide for control of the valve, rotor 42 thereof carries a sprocket gear 43 which is connected by a chain 44 with a sprocket gear 46 on a hollow shaft 47 which is journalled in suitable brackets 48 in the cockpit of the airplane. At its rearward end, the shaft 47 is provided with forked end 49 in which handle 51 is pivoted at 52 for movement between an operative full line position shown in Fig. 1 and an inoperative position as shown in dotted lines.

With the handle 51 in its full line position as shown, it can be rocked in either direction as indicated by the arrows to connect the pressure line 39 to either side of the piston 32 so that the wheel 10 can be moved in either direction to effect steering of the airplane.

By-pass valve means are provided for disabling the steering mechanism when the handle is moved from the full line position shown to the inoperative dotted line position and this means preferably includes a by-pass line 56 connected between the lines 36 and 37 and having a valve casing 57 (Figs. 1 and 4) incorporated therein with an apertured spring-urged plunger 58 disposed in the casing. In the position shown in Fig. 4 the plunger 58 closes the two sides of line 56 so that the by-pass is disabled. However, if the plunger is moved rearwardly to align hole 59 with the line 56, the by-pass will be opened and the piston 32 can be moved in either direction in its cylinder in response to swivelling movement of the wheel 10. To control the position of the plunger 58, a rod 61 which may be formed integrally with the plunger extends outwardly through screw plug 62 and is slidably disposed within the hollow shaft 47. The rearward end of rod 61 is operatively engaged with the hub 63 of control handle 51. Hub 63 is provided with cam 64 (Fig. 4) which in the horizontal position of the control handle becomes effective to move rod 61 and plunger 58 rearwardly to align hole 59 with the two sides of line 56. In this manner the steering mechanism can be disabled.

The operation of the landing gear and the steering mechanism therefor is as follows: With the wheel 10 in the position shown, the pilot of the airplane moves the control handle 51 either to the right or the left in accordance with the direction in which he wishes to turn the wheel 10, so that either one of the lines 36 or 37 are connected with the pressure line 39. The liquid pressure forces the piston toward the front or the rear of the cylinder 31 to correspondingly effect turning of the wheel 10. When the desired amount of turning is accomplished, the handle 51 is restored to its upright neutral position, and the wheel 10 is thereby locked hydraulically in its adjusted position.

If it is desired to disable the steering mechanism as for example when the airplane is being towed, the handle 51 can be moved to its dotted line position when the by-pass valve will be opened and the piston rod 29 will be free to move in response to swivelling of the wheel.

One feature of my invention lies in the automatic adjustment of the wheel 10 to its straight-ahead position when it is retracted, irrespective of whether or not it is in such position while in its ground-engaging position. Also the wheel can be retracted, whether or not the handle 51 is in its inoperative position, and the wheel 10 will turn to its straight ahead position. As the strut structure 17 is revolved in its bearings 19, the link 26 will turn about its pivot 23 and at the same time will effect turning movement of the cylinder 14 and the rod 13 so that when the wheel reaches its retracted position it will be turned to its straight-ahead position when the pivotal axis 23 is substantially upright as shown in Fig. 3. If the piston 32 is locked in position, the pivoting movement of link 26 provides for the movement of the wheel to its straight-ahead position without affecting the position of the piston.

I claim:

1. In an airplane, airplane structure, strut means pivotally supported on said structure, a wheel, pivotal connecting means between said wheel and said strut means to provide for steering and swivelling movement of said wheel, said connecting means including a shock-absorbing connection, said strut means and said wheel being movable to place said wheel in a retracted position or in a lowered ground-engaging position, a source of fluid pressure, and steering means for said wheel including a pressure cylinder and valve control means between said cylinder and said source of pressure, said cylinder having a pivotal connection with said wheel lying in a plane containing the axis of said cylinder in the lowered position of said wheel and lying in a plane substantially at a right angle to said cylinder axis in the retracted position of said wheel.

2. In an airplane, airplane structure, a wheel, means connecting said wheel to said structure for movement between a ground-engaging position and a retracted position including means providing for steering movement of said wheel, hydraulic means for effecting said steering movement, said hydraulic means including a by-pass valve for conditioning said wheel for free swivelling movement, and control means having one position for opening said by-pass valve and another position for closing said by-pass valve and for causing steering movement of said wheel in either direction.

3. In an airplane, airplane structure, a wheel structure, means connecting said wheel structure to said airplane structure for movement between a ground-engaging position and a retracted position including means providing for steering movement of said wheel structure, hydraulic means for effecting said steering movement including a piston and cylinder structure and control means therefor, and a linkage having a pivotal connection with said wheel structure about an axis perpendicular to the axis of said steering movement and having a universal connection with said piston and cylinder structure.

4. In an airplane, airplane structure, a wheel structure, a pivotal connection between said wheel structure and said airplane structure providing for swinging movement of said wheel structure between a ground-engaging position and a retracted position, means for effecting steering movement of said wheel structure, said last-named means including a linkage having a pivotal connection with said wheel structure about an axis perpendicular to the axis of said steering movement, and an operating rod having a universal connection with said linkage, whereby said wheel structure will be adjusted to straight ahead position when retracted irrespective of steering adjustment thereof in said ground engaging position.

5. In an airplane, airplane structure, a wheel, means connecting said wheel to said structure for movement between a ground-engaging position and a retracted position including means providing for steering movement of said wheel, power-operated means for effecting said steering movement, said power-operated means including an element operable to disable the operative connection between said power-operated means and said wheel, and control means having one position for operating said disabling element and another position for rendering said disabling element ineffective and for causing steering movement of said wheel in either direction.

LLOYD C. STEARMAN.